United States Patent
Ikeda et al.

(10) Patent No.: US 8,635,986 B2
(45) Date of Patent: Jan. 28, 2014

(54) ROTATION ANGLE SENSORS

(75) Inventors: Tsutomu Ikeda, Tokoname (JP); Katsumi Ishida, Toyoake (JP); Makoto Mase, Handa (JP); Shuji Yamamoto, Inazawa (JP); Tetsuo Suzuoki, Obu (JP); Masashi Ozeki, Obu (JP)

(73) Assignee: Aisan Kogyo Kabushiki Kaisha, Obu-shi, Aichi-ken (JP)

( * ) Notice: Subject to any disclaimer, the term of this patent is extended or adjusted under 35 U.S.C. 154(b) by 363 days.

(21) Appl. No.: 12/908,951

(22) Filed: Oct. 21, 2010

(65) Prior Publication Data
US 2011/0094474 A1  Apr. 28, 2011

(30) Foreign Application Priority Data

Oct. 26, 2009  (JP) ................... 2009-245296
Nov. 11, 2009  (JP) ................... 2009-258202

(51) Int. Cl.
*G01B 7/30* (2006.01)

(52) U.S. Cl.
USPC ........................................... 123/403

(58) Field of Classification Search
USPC ............ 123/337, 346, 361, 399, 403; 251/129.11; 324/207.21, 207.25; 73/114.36
See application file for complete search history.

(56) References Cited

U.S. PATENT DOCUMENTS

| | | | |
|---|---|---|---|
| 7,032,569 B2 | 4/2006 | Ikeda et al. | |
| 7,042,212 B2 * | 5/2006 | Yoshikawa et al. | 324/207.25 |
| 7,210,451 B2 | 5/2007 | Ikeda et al. | |
| 7,216,625 B2 | 5/2007 | Ikeda et al. | |
| 7,389,765 B2 | 6/2008 | Ikeda | |
| 2007/0247143 A1 | 10/2007 | Ikeda et al. | |
| 2008/0012555 A1 * | 1/2008 | Ikeda | 324/207.25 |
| 2008/0121831 A1 * | 5/2008 | Ikeda | 251/129.11 |

FOREIGN PATENT DOCUMENTS

| | | |
|---|---|---|
| JP | 07130917 | 5/1995 |
| JP | 2004122367 | 4/2004 |
| JP | 2008008754 | 1/2008 |
| JP | 2008145258 | 6/2008 |

* cited by examiner

*Primary Examiner* — Stephen K Cronin
*Assistant Examiner* — Elizabeth Hadley
(74) *Attorney, Agent, or Firm* — Ladas & Parry LLP

(57) ABSTRACT

Angle sensor device has magnetic force detectors detecting alternation of magnetic force caused by rotation of a throttle gear. The magnetic force detectors are buried in a molded body of the angle sensor device constructed of foamed resin. The magnetic force detectors each has a sensing unit detecting alteration of magnetic force and a computing unit computing based on signals from the sensing unit and outputting signals depending on the alteration of magnetic force and is formed in L-shape. Two of the magnetic force detectors are placed opposite each other such that one of the sensing units is disposed on the other sensing unit. The molded body has a cavity surrounded by the magnetic force detectors.

5 Claims, 17 Drawing Sheets

ROTATION ANGLE SENSORS

CROSS-REFERENCES TO RELATED APPLICATIONS

This application claims priority to Japanese patent applications No 2009-245296 and 2009-258202, the components of which are incorporated herein by reference.

BACKGROUND OF THE INVENTION

1. Field of the Invention

The present disclosure relates to angle sensor devices and manufacturing methods thereof, and throttle controllers having one of the angle sensor devices.

2. Description of the Related Art

A throttle controller mounted on a gas vehicle comprises an angle sensor device for measuring rotational angle of a rotatable member. The angle sensor has at least one magnetic force detector for detecting alteration of magnetic force caused by rotation of the rotatable member. FIG. 1 is a cross sectional view showing one of conventional angle sensor devices disclosed in Japanese Laid-Open Patent Publication No. 2008-145258. The angle sensor device 266 includes a housing 272 with an opening, two magnetic force detectors 270 provided in the housing 272, a holder 274 closing the opening of the housing 272 and holding the magnetic force detectors 270, and potting material 276 filled in an inner space enclosed by the housing 272 and the holder 274.

Thus, the angle sensor device 266 needs the housing 272, the holder 274 and the potting material 276 for holding the magnetic force detectors 270.

Therefore, there is a need in the art for an improved angle sensor device and an improved manufacturing method thereof.

SUMMARY OF THE INVENTION

One aspect according to an angle sensor device for measuring rational angle of a rotatable member of the present disclosure includes a molded body constructed of foamed resin, and at least one magnetic force detector buried in the body for detecting alteration of magnetic force caused by rotation of the rotatable member and outputting signals depending on the rotation angle of the rotatable member.

The magnetic force detector is buried in and held by the molded body. Therefore, it is able to reduce number of members for holding the magnetic force detector compared with the conventional angle sensor device, so that production cost for the device can be decreased.

Another aspect according to a method for manufacturing an angle sensor device including at least one magnetic force detector for detecting alteration of magnetic force caused by rotation of a rotatable member of the present disclosure includes placing the magnetic force detector in a mold, and molding the foamed resin in the mold such that the magnetic force detector is buried in the foamed resin.

The magnetic force detector of the manufactured angle sensor device is buried in and held by the molded foamed resin. Therefore, it is able to reduce a step for placing a holder used for holding the magnetic force detector compared with the conventional manufacturing method, so that production cost can be decreased.

DETAILED DESCRIPTION OF THE PREFERRED EMBODIMENTS

Each of the additional features and teachings disclosed above and below may be utilized separately or in conjunction with other features and teachings to provide improved angle sensor devices, manufacturing methods thereof and throttle controllers having the angle sensor devices. Representative examples of the present disclosure, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

Figure 1:
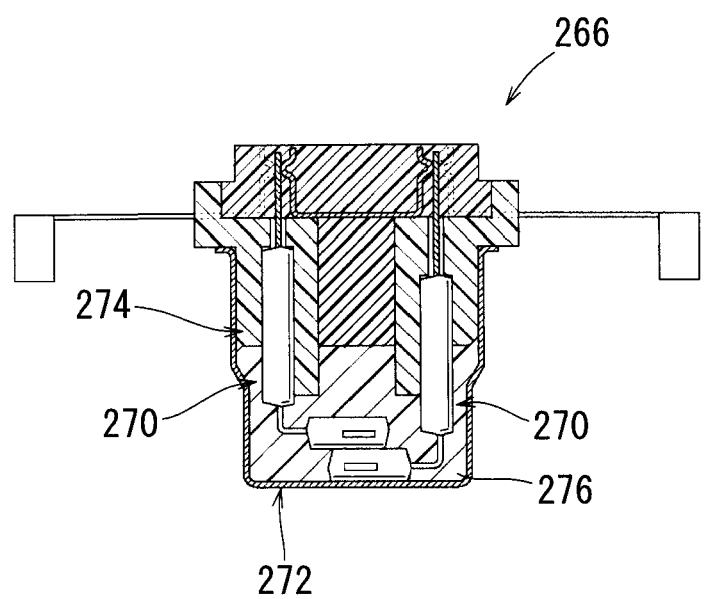
FIG. 1 is a cross sectional view showing a conventional angle sensor device.
Figure 2:
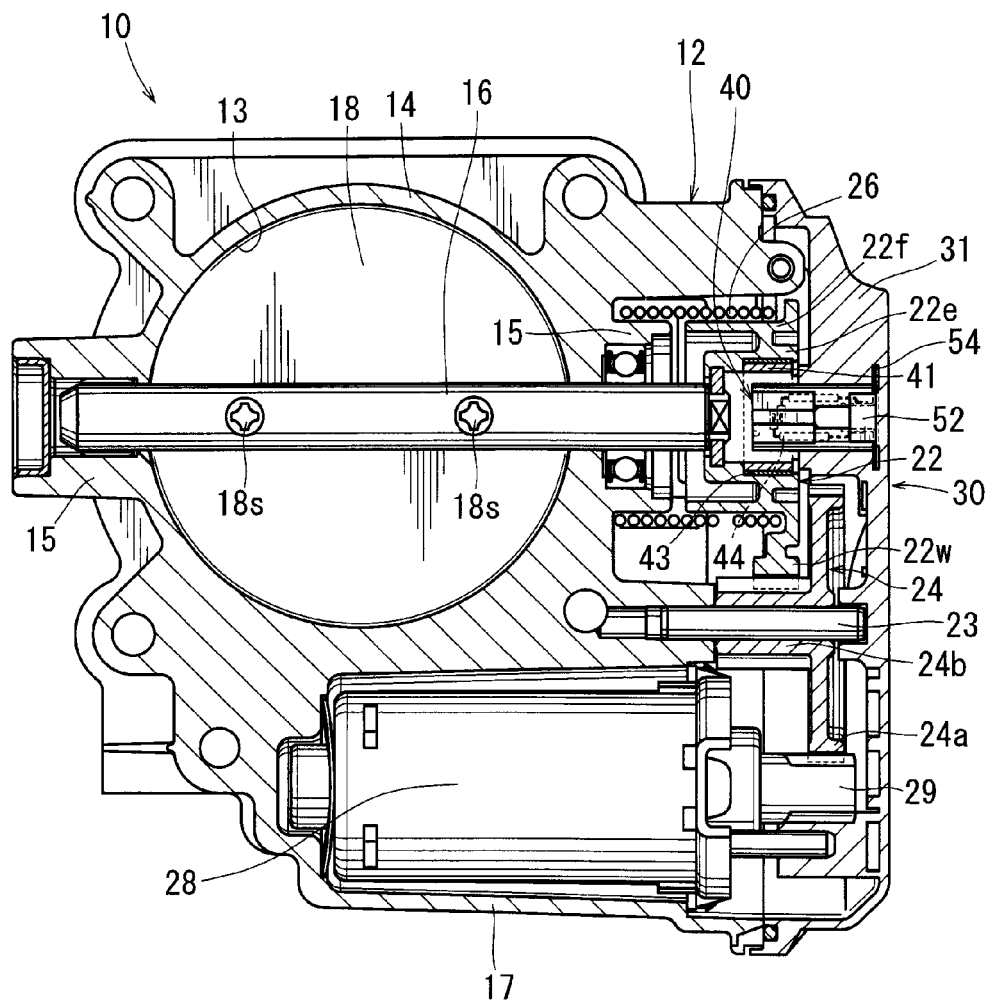
FIG. 2 is a cross sectional view of a throttle controller of a first embodiment.

A first embodiment of the present disclosure will be described in reference to attached drawings. This embodiment relates an angle sensor device used as throttle position sensor for detecting rotation angle, i.e. opening ratio, of a throttle valve in an electronically-controlled throttle controller, which is mounted on a vehicle such as gasoline automobile. Firstly, the throttle controller will be described. FIG. 2 is a cross sectional view of the throttle controller. As for explanation of the throttle controller, "right", "left", "up" and "down" are defined based on directions in FIG. 2.

As shown in FIG. 2, a throttle controller 10 has a throttle body 12. The throttle body 12 is constructed of, e.g., resin and has a bore defining wall 14 and a motor housing 17 integrally with each other. The bore defining wall 14 is formed in a hollow cylindrical shape extending in a direction perpendicular to the sheet of FIG. 2. The bore defining wall 14 has a bore 13 as intake pathway therein. An upstream end of the bore defining wall 14 is connected with an air cleaner (not shown), whereas a downstream end is connected with an intake manifold (not shown). The bore defining wall 14 is provided with a metal throttle shaft 16 passing through the bore 13 in a radial direction, i.e. a horizontal direction in FIG. 2. The throttle shaft 16 is supported by bearings (not labeled) such that the throttle shaft 16 can rotate with respect to bearing portions 15 provided at both right and left sides of the bore defining wall 14. A throttle valve 18 of butterfly valve type in circular plate shape is fastened on the throttle shaft 16 by screws 18s. The throttle valve 18 rotates together with the throttle shaft 16 in order to open and close the bore 13.

A right end of the throttle shaft 16 passes through the right bearing portion 15. A throttle gear 22 is concentrically attached to the right end of the throttle shaft 16 such that the throttle gear 22 cannot rotate relative to the throttle shaft 16. The throttle gear 22 is constructed of resin or the like and has an inner cylinder 22e and an outer cylinder 22f in a double cylinder structure such that the inner cylinder 22e is inside the outer cylinder 22f. A gear portion 22w in a fan-like shape is formed on an outer surface of the outer cylinder 22f. A back spring 26 consisting of a coil spring is disposed between the throttle gear 22 and a right surface of the throttle body 12 facing the throttle gear 22. The back spring 26 biases the throttle gear 22 in a closing direction. The throttle spring 26 is disposed around the outer cylinder 22f of the throttle gear 22 and the right bearing portion 15.

The motor housing 17 of the throttle body 12 defines a hollow cylinder space opening at right side such that an axis of the space is parallel to the throttle shaft 16. The motor housing 17 houses a driving motor 28 such as direct-current (DC) motor. An output shaft (not shown) of the driving motor 28 is rotated due to signals from an engine control unit, ECU, (not shown) depending on angle of accelerator pedal of the vehicle or the like. The output shaft of the driving motor 28 protrudes in a right direction in FIG. 2, and a pinion gear 29 is attached to the output shaft. A counter shaft 23 parallel to the throttle shaft 16 is disposed at the right side of the throttle body 12. The counter shaft 23 has a counter gear 24 rotatably mounted on the counter shaft 23. The counter gear 24 has a two gear portions 24a and 24b, radii of which are different from each other. The larger gear portion 24a mates with the pinion gear 29, whereas the smaller gear portion 24b mates with the gear portion 22w of the throttle gear 22. Therefore, rotary drive power of the driving motor 28 is transmitted to the throttle shaft 16 via the pinion gear 29, the counter gear 24 and the throttle gear 22. Thus, the throttle valve 18 is rotated in the bore 13, i.e., opened and closed in order to control an amount of air flowing through the bore 13. Here, a reduction gear mechanism is composed of the pinion gear 29, the counter gear 24 and the throttle gear 22.

Figure 3:
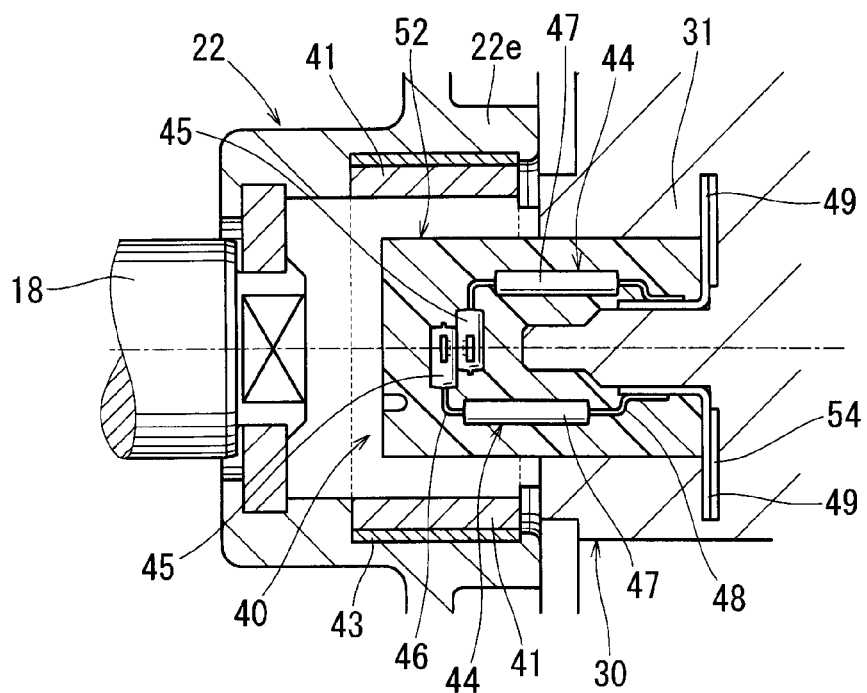
FIG. 3 is a cross sectional view showing a throttle gear and a surrounding area thereof.

A cylinder shaped yoke 43 and a pair of permanent magnets disposed inside the yoke 43 are provided integrally inside the inner cylinder 22e of the throttle gear 22 (FIG. 3). The pair of the permanent magnets 41 is constructed of ferrite magnet or the like and positioned in parallel in order to generate substantially parallel magnetic field between thereof. The yoke 43 is constructed of magnetic material and is buried in the inner cylinder 22e. Here, FIG. 3 is a cross sectional view showing a throttle gear and a surrounding area thereof.

Figure 4:
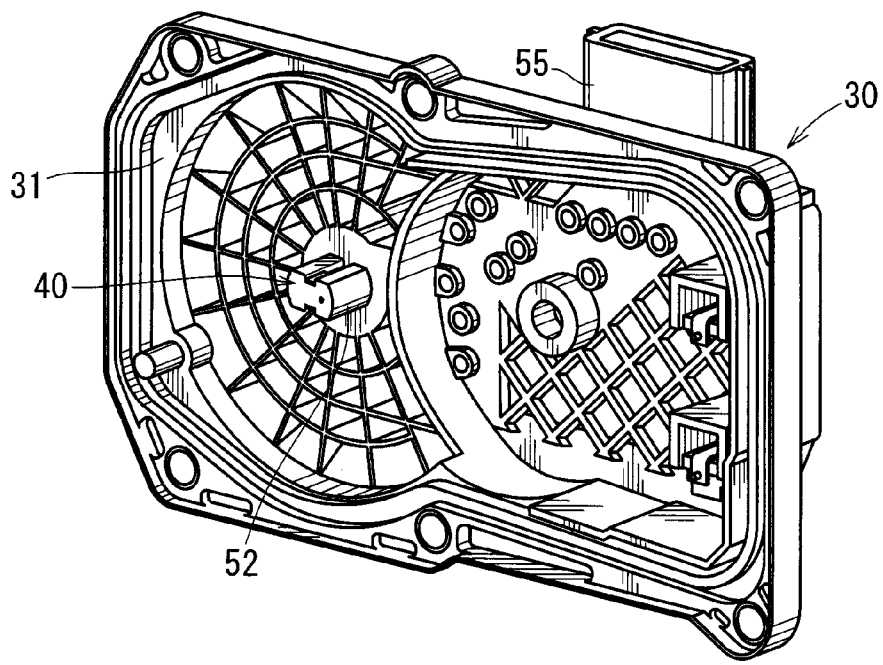
FIG. 4 is a perspective view of a sensor cover.

As shown in FIG. 2, the right surface of the throttle body 12 is provided with a sensor cover 30 for covering the reduction gear mechanism (the pinion gear 29, the counter gear 24 and the throttle gear 22), etc. The sensor cover 30 is constructed of resin or the like and is integrated with an angle sensor device 40 for measuring rotation angle of the throttle gear 22, i.e. opening ratio of the throttle valve 18, due to insert molding (FIG. 4). Here, FIG. 4 is a perspective view of the sensor cover.

The angle sensor device 40 is formed in a substantially cylindrical shape. A base of the angle sensor device 40 is buried in a cover body 31 of the sensor cover 30, which is constructed of resin, whereas a top end is exposed at an inner surface of the cover body 31 (FIGS. 3 and 4). The top end of the angle sensor device 40 is concentrically and loosely inserted into the inner cylinder 22e of the throttle gear 22 (FIG. 3). Therefore, the angle sensor device 40 does not contact with the permanent magnets 41 and the yoke 43 of the throttle gear 22. Here, the throttle gear 22 corresponds to "rotatable member" in the present disclosure.

Figure 5:
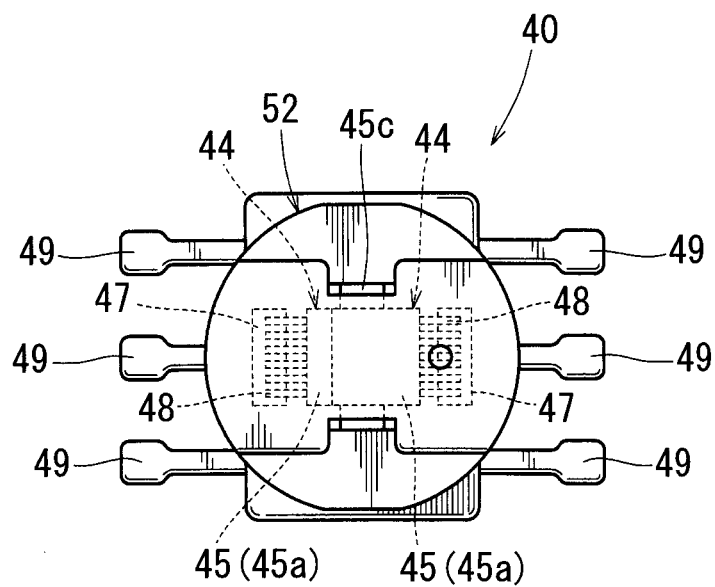
FIG. 5 is a front view of an angle sensor device.
Figure 6:
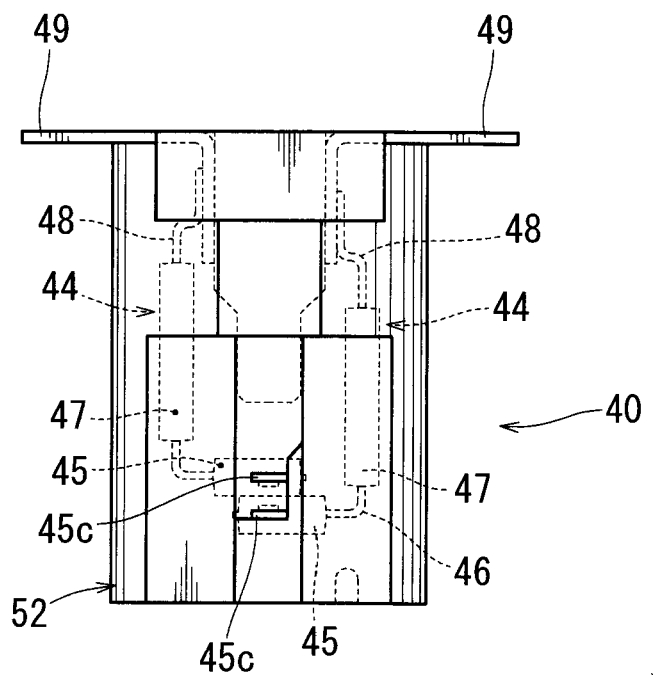
FIG. 6 is a top view of the angle sensor device.
Figure 7:
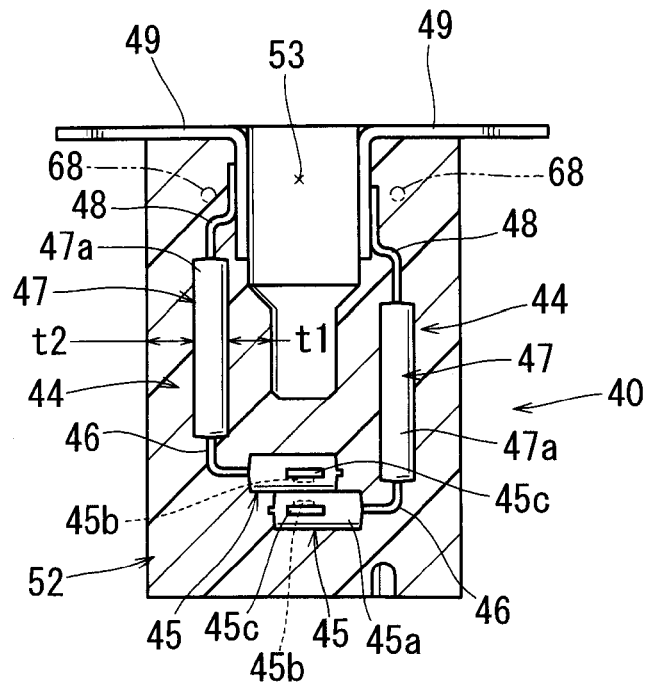
FIG. 7 is a cross sectional view of the angle sensor device.

Next, the angle sensor device 40 will be described. FIGS. 5, 6 and 7 are a front view, a top view and a cross sectional view of the angle sensor device, respectively. For convenience of explanation, as for the angle sensor device 40, "front" is defined at the end side (lower side in FIGS. 6 and 7), and "back" is defined at the base side (upper side in FIGS. 6 and 7). In addition, "inside" is defined at center side in horizontal direction in FIGS. 6 and 7, whereas "outside" is defined at right and left sides in FIGS. 6 and 7.

As shown in FIG. 7, the angle sensor device 40 has a pair of magnetic force detectors 44 and a molded resin (i.e., molded body) 52 in a cylinder shape, in which the magnetic force detectors 44 are buried. The angle sensor device 40 detects alteration of magnetic force caused by rotation of throttle gear 22 (FIG. 3), and has two magnetic force detectors 44 in view of fail-safe such that if one of the magnetic force detectors 44 goes out of order, the other can detect alteration of magnetic force.

For convenience of explanation for configuration of the magnetic force detectors 44, one of the magnetic force detectors 44 will be described. As shown in FIG. 7, the magnetic force detector 44 is composed of a sensor integrated circuit (sensor IC) having a magnetoresistance element referred to as MR element or the like, where a sensing unit 45 is connected with a computing unit 47 via a plurality of connecting terminals 46. The sensing unit 45 has a body 45a constructed of resin in a rectangular parallelepiped shape, which houses a chip 45b composed of a magnetoresistance element. The computing unit 47 has a body 47a constructed of resin in a rectangular parallelepiped shape, which houses a semiconductor integrated circuit (not shown). The sensing unit 45 and the computing unit 47 are electrically connected with each other via the plurality of the connecting terminals 46 connecting a front surface of the computing unit 47 and an end surface of the sensing unit 45. The connecting terminals 46 are bent in L-shape, so that the magnetic force detector 44 including the sensing unit 45, the connecting terminals 46 and the computing unit 47 is formed in L-shape. A back end surface of the computing unit 47 is connected with ends (base portions) of a plurality of, e.g., three, lead terminals 48.

The chip 45b of the sensing unit 45 is disposed at a center region of a metallic support plate 45c in elongate shape. The support plate 45c is buried in the body 45a such that a longitudinal axis of the support plate 45c is parallel to a width direction of the sensing unit 45 (a direction perpendicular to the sheet in FIG. 7). Each ends of the support plate 45c in the longitudinal direction of the support plate 45c protrudes from either surfaces of the body 45a in the width direction of the body 45a (FIGS. 5 and 6). The sensing unit 45 is disposed such that its both end surfaces in a through-thickness direction of the sensing unit 45 (vertical direction in FIG. 7) are perpendicular to an axis of the throttle gear 22 and that the chip 45b is positioned on an axis of the molded resin 52. In a state that the sensor cover 30 is mounted on the throttle body 12 (FIG. 2), the chip 45b of the sensing unit 45 is positioned between the pair of the permanent magnets 41 of the throttle gear 22 and on an axis of the throttle shaft 16. Thus, the sensing unit 45, in particular the chip 45b, can detect alteration of magnetic force, that is, direction of magnetic field generated between the pair of the permanent magnets 41.

The sensing unit 45 outputs signals based on detection result of alteration of magnetic force, and the computing unit 47, particularly the semiconductor integrated circuit, receives the signals via the connecting terminals 46. The computing unit 47 computes based on the signals from the sensing unit 45 and outputs signals depending on the direction of the magnetic field. The engine control unit, ECU, (not shown) calculates rotation angle of the throttle gear 22, i.e., opening ratio of the throttle valve 18 depending on the signals from the computing unit 47. The computing unit 47 is programmed to output voltage signals in a linear manner depending on the rotation angle of the throttle gear 22.

As shown in FIG. 7, the pair of the magnetic force detectors 44 is disposed opposite each other in the horizontal direction such that the sensing units 45a are aligned in a front-back direction (vertical direction in FIG. 7) and contact with each other. The chips 45b of the sensing units 45 are positioned to face one another on the axis of the molded resin 52. The support plates 45c of the sensing units 45 are in a line along the front-back direction (vertical direction in FIG. 7). The computing units 47 of the magnetic force detectors 44 are positioned parallel to each other and at a distance in the horizontal direction in FIG. 7.

Each lead terminal 48 of the computing units 47 is bent such that an end and a base portion thereof are uneven and parallel to each other. Therefore, the end of the lead terminal 48 (upper end in FIG. 7) is located medially compared with the base portion. Inner surfaces of the ends of lead terminals 48 are coupled with halves of an L-shaped mounting terminals 49 (referred to as "base portion") by, e.g., welding, respectively. On the other hand, the other halves of the mounting terminals 49 (referred to as "end portion") protrude outwardly, i.e., oppositely each other in the horizontal direction in FIG. 7, at a back end of the molded resin 52.

The molded resin 52 is constructed of chemical foamed resin and is formed in cylinder shape. Both the magnetic force detectors 44, which include the sensing unit 45, the connecting terminals 46, the computing unit 47 and the lead terminals 48, and connections between the lead terminals 48 and the mounting terminals 49 of the magnetic force detectors 44 are buried in the molded resin 52. The molded resin 52 has a cavity 53 surrounded by the magnetic force detectors 44. The cavity 53 opens at the back surface (upper surface in FIG. 7) of the molded resin 52. Due to this configuration, thickness of the molded resin 52 in an area surrounded by the magnetic force detectors 44, (in particular, thickness of the molded resin inside the computing units 47) is equalized in a longitudinal direction of the computing units 47 (vertical direction in FIG. 7). That is, thickness t1 of the molded resin 52 inside either of the computing units 47 in the horizontal direction is equalized along the front-back direction (vertical direction in FIG. 7). And, thickness t2 of the molded resin 52 outside either of the computing units 47 in the horizontal direction is equalized in the longitudinal direction of the computing unit 47 (front-back direction). In addition, the thickness t1 and the thickness t2 are equalized each other. Inner surfaces of the base portions of the mounting terminals 49 of the magnetic force detectors 44 are exposed at an inner wall defining the cavity 53.

Figure 8:
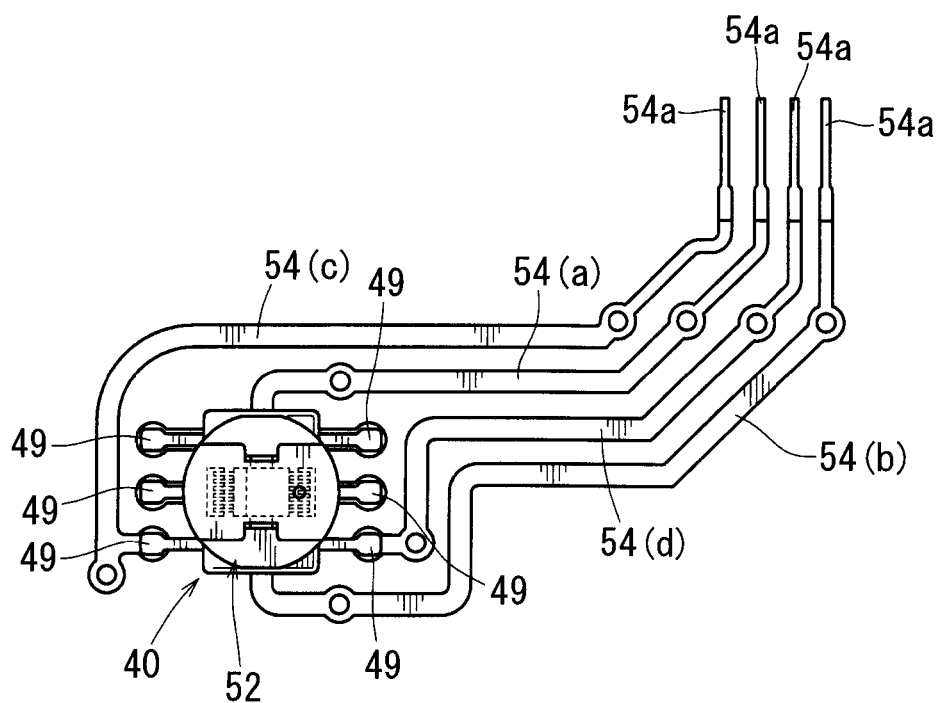
FIG. 8 is a front view of the angle sensor device connected with wiring terminals.
Figure 9:
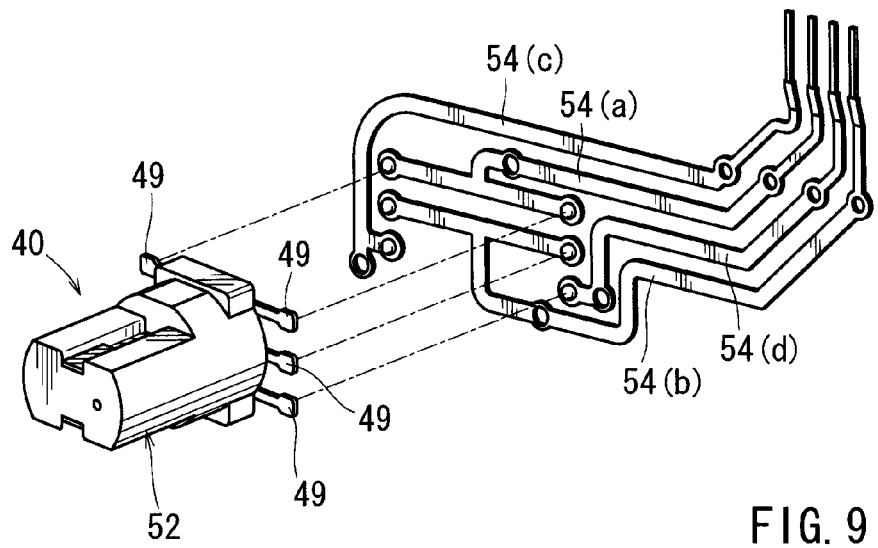
FIG. 9 is a perspective view showing the angle sensor device and the wiring terminals.

When the angle sensor device 40 is integrated with the sensor cover 30 by insert molding (FIG. 4), ends of the mounting terminals 49 are connected with base portions of wiring terminals 54 by, e.g., welding, respectively (FIG. 8). Here, the wiring terminal 54(a) is used for connection with a power supply, the wiring terminal 54(b) is used for connection to ground, and the wiring terminals 54(c) and 54(d) are used for outputting signals. FIG. 8 is a front view of the angle sensor device with the wiring terminals, and FIG. 9 is a perspective view showing the wiring terminals and the angle sensor device disassembled each other.

The angle sensor device 40 connected with the wiring terminals 54 (FIG. 8) is integrated with the sensor cover 30 by insert molding (FIG. 4). The base of the angle sensor device 40 is buried in the cover body 31 of the sensor cover 30, which is constructed of resin, and the top end of the angle sensor device 40 is exposed at the inner surface of the cover body 31. Therefore, the connections between the mounting terminals 49 of the angle sensor device 40 and the wiring terminals 49, and most of the wiring terminals 54 except each end 54a of the wiring terminals 54 are buried in the cover body 31. The ends 54a of the wiring terminals 54 (FIG. 8) are exposed within a connecter portion 55 formed on the cover body 31 (FIG. 4). The connector portion 55 is formed to connect with an outer connector (not shown) of the engine control unit (ECU). Therefore, signals output from the computing units 47 of the magnetic force detectors 44 (FIG. 3) are transmitted to the engine control unit. In addition, an outer surface of the end of the molded resin 52 of the angle sensor device 40, which is exposed at the inner surface of the cover body 31, is preferably coated with moisture-proof material.

The cover body 31 is constructed of another resin different from the foamed resin used for the molded resin 52 of the angle sensor device 40. That is, the foamed resin for the molded resin 52 is composed of the resin for the cover body 31 and foaming agent. For, example, polybutylene terephthalate (PTB) resin can be used for the cover body 31.

Figure 10:
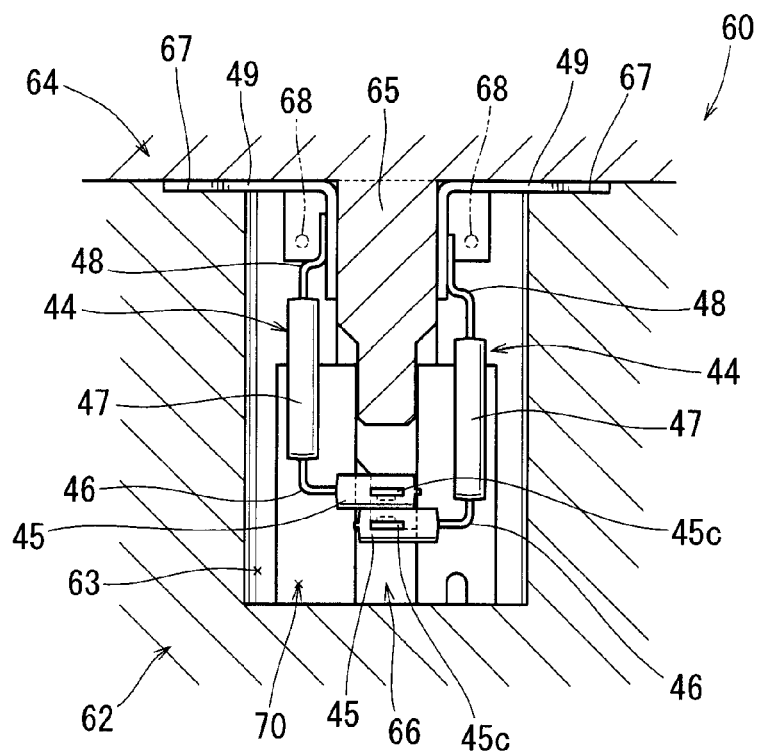
FIG. 10 is a cross sectional view of a mold and magnetic force detectors positioned in the mold for manufacture of the angle sensor device.
Figure 11:
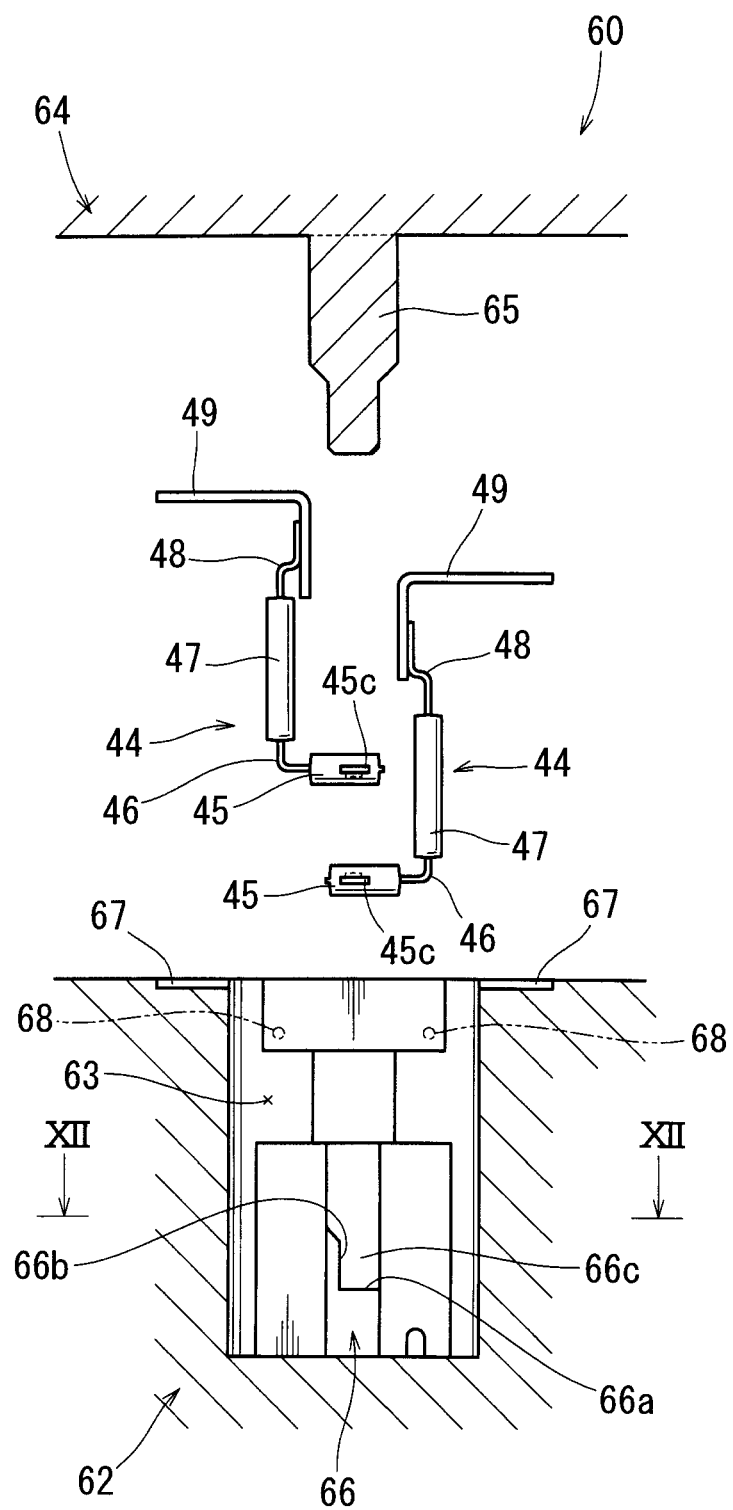
FIG. 11 is a cross sectional view showing the mold and the magnetic force detectors disassembled each other.
Figure 12:
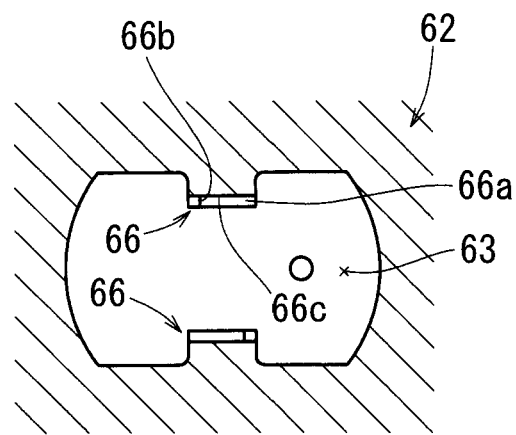
FIG. 12 is a cross sectional view indicated by a line XII-XII in FIG. 11.

Next, a manufacturing method for the angle sensor device 40, i.e., a method for forming the molded resin 52, will be described. FIG. 10 is a cross sectional view of a mold used for manufacture of the angle sensor device. FIG. 11 is a cross sectional view showing the mold and the magnetic force detectors disassembled each other. FIG. 12 is a cross sectional view along a line XII-XII in FIG. 11.

Firstly, the mold for insert molding of the foamed resin with the magnetic force detectors 44 will be described. As shown in FIG. 11, the mold 60 is composed of a lower mold 62 and an upper mold 64. The lower mold 62 is used for forming a front surface and an outer circumference surface of the molded resin 52 (FIG. 5-7) and has a cylinder-shaped mold cavity 63 opening at one end. The upper mold 64 is used for forming a back surface and the cavity 53 (FIG. 7) and has a projection 65 at a lower surface, which is directed to the lower mold 62 during molding operation.

Both sidewalls of the mold cavity 63 of the lower mold 62 (in the width direction of the magnetic force detector 44, i.e., a direction perpendicular to the sheet in FIG. 11) are provided with L-shaped positioning parts 66 in symmetry manner with respect to an axis of the mold cavity 63 (FIG. 12). As shown in FIG. 11, the positioning parts 66 can engage with either ends of the support plates 45c of the sensing units 45 of the magnetic force detectors 44. Each of the positioning parts 66 has a first horizontal surface 66a, which contacts with a front surface of the end of the support plate 45c of the sensing unit 45, a second vertical surface 66b, which contacts with one of side surfaces (left side surface in FIG. 11) of the end of the support plate 45c of the sensing unit 45, and a third vertical surface 66c, which contacts with an end surface of the support plate 45c of the magnetic force detector 44 in the longitudinal direction of the support plate 45c (FIG. 12). In addition, recesses 67 are formed on an upper surface of the lower mold 62 for receiving the end portions of the mounting terminals 49 (FIG. 11).

One of the sidewalls of the mold cavity 63 of the lower mold 62 (one of the sidewalls in the width direction of the magnetic force detector 44) is provided with a pair of gates 68. The gates 68 are positioned such that when the magnetic force detectors 44 are disposed in the lower mold 62, each of the gates 68 is near and outside the ends of the lead terminals 48 of the corresponding magnetic force detector 44 (FIG. 10).

Next, a step of inset molding of foamed resin with the magnetic force detectors 44 in the mold 60.

In a state that the mold 60 is opened (FIG. 11), the right magnetic force detector 44 is placed in the mold cavity 63 of the lower mold 62. Each end of the support plate 45 of the right magnetic force detector 44 is contacted with the first surface 66a, the second surface 66b and the third surface 66c of the corresponding positioning part 66 (FIGS. 11 and 12). Thus, the sensing unit 45 of the right magnetic force detector 44 is held in place (FIG. 10). The end portions of the mounting terminals 49 of the right magnetic force detector 44 are received in the right recesses 67, respectively, so that the right magnetic force detector 44 is held in place.

Then, the left magnetic force detector 44 is placed in the mold cavity 63 of the lower mold 62 such that the right and the left magnetic force detectors 44 are opposite each other. The sensing unit 45 of the left magnetic force detector 44 is positioned that the magnetic force detectors 44 are arranged in the front-back direction (vertical direction in FIGS. 10 and 11) and contacted with each other. With this, each end of the support plate 45c of the sensing unit 45 of the left magnetic force detector 44 is contacted with the second surface 66b and the third surface 66c of the corresponding positioning part 66 (FIGS. 11 and 12). Therefore, the sensing unit 45 of the left magnetic force detector 44 is held in place (FIG. 10). In addition, the end portions of the mounting terminals 49 of the left magnetic force detector 44 are received in the left recesses 67, respectively, so that the left magnetic force detector 44 is held in place.

After the magnetic force detectors 44 are placed in the lower mold 62 as described above, the mold 60 is closed, i.e., the lower mold 62 is fitted with the upper mold 64 (FIG. 10). Thus, the opening of the mold cavity 63 of the lower mold 62 is closed by the upper mold 64, so that an enclosed cavity 70 is formed. With this, the end portions of the mounting terminals 49 of the magnetic force detectors 44 are held between the lower mold 62, in particular bottom surfaces of the recesses 67, and the upper mold 64. And, inner surfaces of the base portions of the mounting terminals 49 of the magnetic force detectors 44 are contacted with corresponding sidewall of the projection of the upper mold 64, respectively. Thus, the end portions of the mounting terminals 49 of the magnetic force detectors 44 are held by the mold 60, so that it is able to prevent movement of the magnetic force detectors 44 caused by flow of the foamed resin during insert molding.

Then, the foamed resin (melting resin) is injected into the cavity 70 from both of the gates 68 of the lower mold 62 in order to form the molded resin 52. In this step, the foamed resin is flowed equally along both of the inner surface and the outer surface of the computing unit 47 of each of the magnetic force detectors 44, so that stress applied to the magnetic force detectors 44 due to flow of the foamed resin is equalized. The cavity 53 is formed in the molded resin 52 due to the projection 65 of the upper mold 64 (FIG. 7). After forming and then cooling the molded resin 52 in order to harden the foamed resin, the mold 60 is opened and a product, i.e., the angle sensor device 40 is taken from the lower mold 62.

As for the angle sensor device 40 (FIG. 5-7), the magnetic force detectors 44 are buried in the molded foamed resin (the molded resin 52). Therefore, the magnetic force detectors 44 are held by molded foamed resin (the molded resin 52), in which the magnetic force detectors 44 are buried, so that it is able to reduce the number of members for holding the magnetic force detectors 44 compared with the conventional device, which is disclosed in, for example, Japanese Laid-Open Patent Publication No. 2008-145258, thereby decreasing cost for the product. In addition, the foamed resin (the molded resin 52) has high heat insulation properties, so that it is able to protect the magnetic force detectors 44 well from temperature alteration, etc. The foamed resin in melting condition has high fluidity, so that flow pressure of the resin injected during insert molding can be decreased. Therefore, it is able to reduce flow pressure of resin, which is applied to the magnetic force detectors 44 during insert molding, in order to prevent deformation and damage of the magnetic force detectors 44. Furthermore, potting resin, which is used in the conventional device, is not required, thereby decreasing cost for potting resin and for equipment required for the potting resin.

Each of the magnetic force detectors 44 has the sensing unit 45 detecting alteration of magnetic force and outputting signals depending on the alteration and the computing unit 47 computing based on signals from the sensing unit 45 and then outputting signals depending on alteration of the magnetic force such that the sensing unit 45 and the computing unit 47 are coupled in L-shape (FIG. 7). Therefore, it is able to downsize the magnetic force detectors each having the sensing unit 45 and the computing unit 47.

In this embodiment, the pair of the magnetic force detectors 44 is placed opposite each other such that one of the sensing units 45 is laid on top of another (FIG. 7). Therefore, it is able to place the pair of the magnetic force detectors 44 compactly.

The molded resin 52 has the cavity 53 in the area surrounded by the magnetic force detectors 44 (FIG. 7). Therefore, it is able to equalize the thickness of the molded resin 52 in the area between the magnetic force detectors 44.

The lead terminals 48 of the magnetic force detectors 44 are connected with the mounting terminals 49, and the connections between the lead terminals 48 and the mounting terminals 49 are buried in the foamed resin (the molded resin 52) (FIG. 7). Thus, the connections between the lead terminals 48 of the magnetic force detectors 44 and the mounting terminals 49 can be protected due to the foamed resin (the molded resin 52).

The molded resin 52 is constructed of the chemical foamed resin. Therefore, it is able to utilize a conventional injection molding equipment for injection molding of the foamed resin with the magnetic force detectors 44.

The molded resin 52 is partially buried in another resin, of which the cover body 31 is constructed, and the materials for the molded resin 52 is composed of materials for such another resin and a forming agent. Therefore, the foamed resin for the molded resin 52 can has substantially same basic properties as those of the resin for the cover body 31.

According to the manufacturing method of the angle sensor device 40, insert molding of the foamed resin with the magnetic force detectors 44 is carried out in order to bury the magnetic force detectors 44 in the molded resin 52 constructed of the foamed resin. Therefore, the molded resin 52 holds the magnetic force detectors 44 in place, so that it is able to decrease the number of members required for holding the magnetic force detectors 44 and to decrease production cost compared with a conventional angle sensor device, which is disclosed in, for example, Japanese Laid-Open Patent Publication No. 2008-145258.

Each of the magnetic force detectors 44 has the sensing unit 45 detecting alteration of magnetic force and outputting signals depending on the alteration and the computing unit 47 computing based on the signals from the sensing unit 45 and then outputting signals depending on alteration of the magnetic force such that the sensing unit 45 and the computing unit 47 are coupled in L-shape (FIG. 7). Therefore, it is able to downsize the magnetic force detectors each having the sensing unit 45 and the computing unit 47. Furthermore, the insert molding is carried out in a state that the pair of the magnetic force detectors 44 is placed opposite each other such that one of the sensing units 45 is laid on top of another (FIG. 7). Therefore, it is able to place the pair of the magnetic force detectors 44 compactly.

The mold 60 has the projection 65, which can be located in the area between the pair of the magnetic force detectors 44, and the insert molding is carried out in a state that the projection 65 of the mold 60 is placed at the area (FIG. 10). Thus, it is able to equalize the thickness of the molded resin 52 in the area between the magnetic force detectors 44. This equalizes stress applied to the magnetic force detectors 44 and caused by flow of the foamed resin in melting condition during insert molding process, thereby preventing deformation and damage of the magnetic force detectors 44 caused by the stress.

Each of the magnetic force detectors 44 has the lead terminals 48 connected with the corresponding mounting terminals 49, and in a state that the mold 60 supports the mounting terminals 49, the insert molding is carried out such that both the magnetic force detectors 44 and the connections between the lead terminals 48 and the mounting terminals 49 are buried in the foamed resin (FIG. 10). Therefore, it is able to prevent deformation of the mounting terminals 49 caused by flow of the foamed resin in melting condition during insert molding process. In addition, both the magnetic force detectors 44 and the connections between the lead terminals 48 and the mounting terminals 49 can be protected due to the foamed resin forming the molded resin 52.

The inert molding is carried out in a state that the positioning parts 66 of the mold 60 support the sensing units 45 of the magnetic force detectors 44 (FIG. 10). Therefore, it is able to improve location accuracy of the sensing units 45 of the magnetic force detectors 44, thereby improving detection accuracy for alteration of magnetic force.

In injection of the foamed resin into the mold 60, the foamed resin is injected from the gates 68 away from the sensing units 45 of the magnetic force detectors 44 along the longitudinal direction of the computing units 47 of the magnetic force detectors 44. Therefore, the foamed resin is injected into the mold 60 from the gates 68 away from the sensing units 45 of the magnetic force detectors 44, so that it is able to reduce stress applied to the sensing units 45 of the magnetic force detectors 44 caused by flow of the foamed resin in melting condition in order to prevent deformation and damage of the sensing units 45. In addition, the foamed resin is injected along the longitudinal direction of the computing units 47 of the magnetic force detectors 44 (vertical direction in FIG. 10), so that it is able to decrease stress applied to the computing units 47 of the magnetic force detectors 44 caused by flow of the foamed resin in melting condition in order to prevent deformation and damage of the computing units 47 of the magnetic force detectors 44.

According to the throttle controller 10 (FIG. 2), the throttle valve 18 has the throttle gear 22, the sensor cover 30 of the throttle body 12 has the angle sensor device 40, and the opening ratio of the throttle valve 18 is detected based on signals from the magnetic force detectors 44 of the angle sensor device 40. Therefore, it is able to provide the throttle controller 10 having the angle sensor device 40, cost of which is decreased due to reduction of the number of members required for holding the magnetic force detectors 44.

Other embodiments will be described below. Here, differences of following embodiments will be described, whereas the same configurations as those of the described embodiment will not be described.

Figure 13:
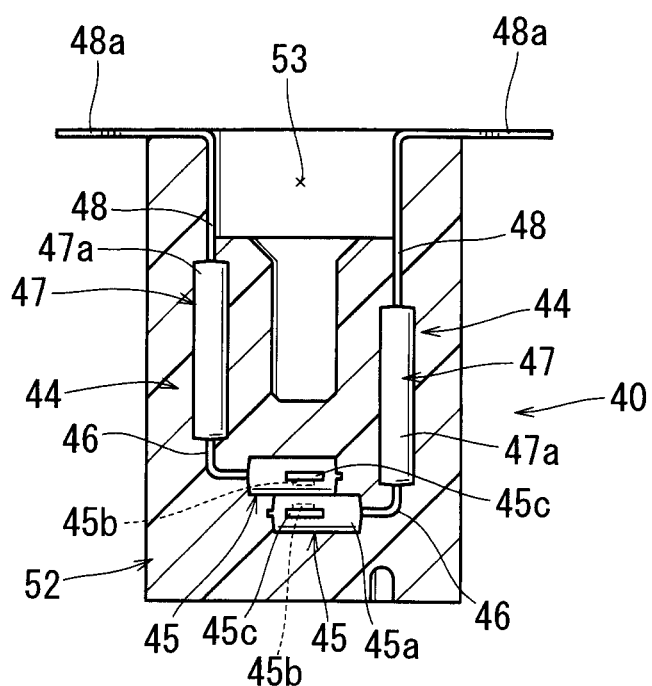
FIG. 13 is a cross sectional view of an angle sensor device of a second embodiment.

FIG. 13 is a cross sectional view showing a second embodiment of the angle sensor device.

As shown in FIG. 13, the angle sensor device 40 of this embodiment does not have the mounting terminals 49 of the first embodiment, and has the magnetic force detectors 44 with the lead terminals 48, which have ends 48a projecting from a back surface of the molded resin 52. The lead terminals 48 are bent in L-shape such that the ends 48a are directed outwardly. Inner surfaces of base potions (except ends near the computing units 47) are exposed at surfaces of the molded resin 52, which defines the cavity 53.

According to this embodiment, it is not necessary to connect the lead terminals 48 of the magnetic force detectors 44 with the mounting terminals 49 protruding from the molded resin 52 constructed of the foamed resin (FIG. 7). Therefore, it is able to reduce the number of components relating to the mounting terminal 49 compared with the first embodiment, thereby decreasing component cost. Furthermore, it is able to omit a step for connecting the lead terminals 48 with the mounting terminals 49 by welding or the like, so that productivity can be improved.

Figure 14:
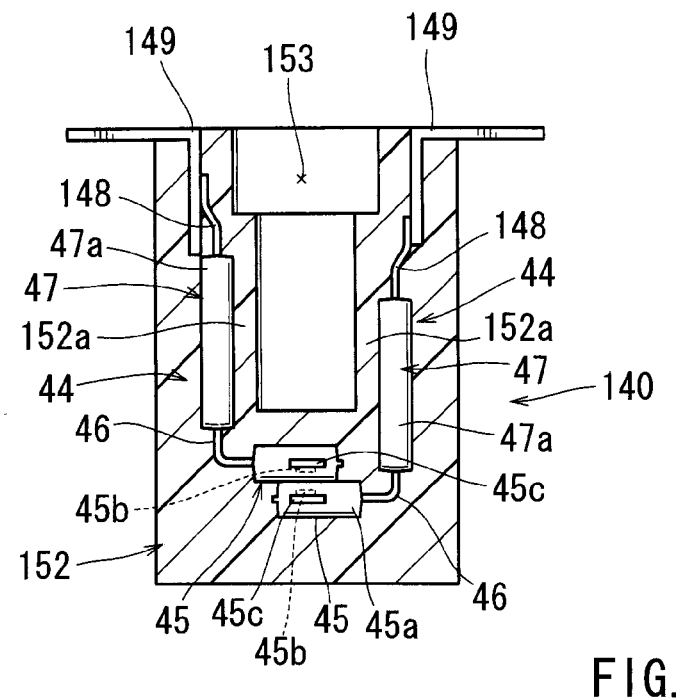
FIG. 14 is a cross sectional view of an angle sensor device of a third embodiment.

FIG. 14 is a cross sectional view of an angle sensor device 140 according to a third embodiment. Here, the angle sensor device 140 is an alternative embodiment of the angle sensor device 40 of the first embodiment.

In this embodiment, lead terminals 148 are bent such that ends of the lead terminals 148 (upper ends in FIG. 14) are positioned outside compared with base portions (lower ends in FIG. 14) connecting with the computing units 47. The end of each lead terminal 148 has a surface directed outwardly and connected with a base portion of a corresponding L-shaped mounting terminal 149 by welding or the like.

Figure 15:
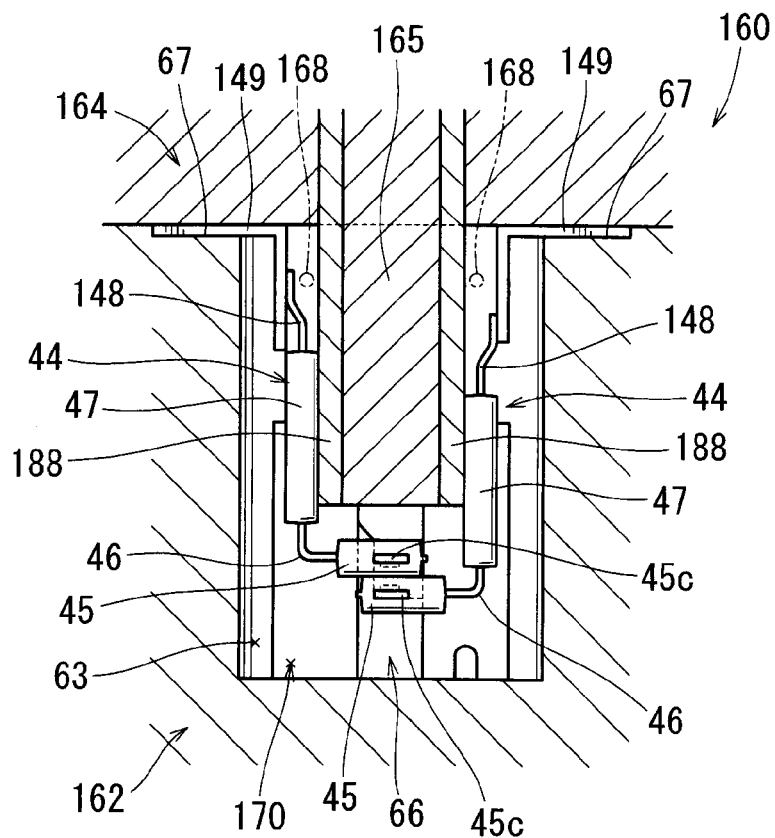
FIG. 15 is a cross sectional view of a mold and magnetic force detectors positioned in the mold for manufacture of the angle sensor device.
Figure 16:
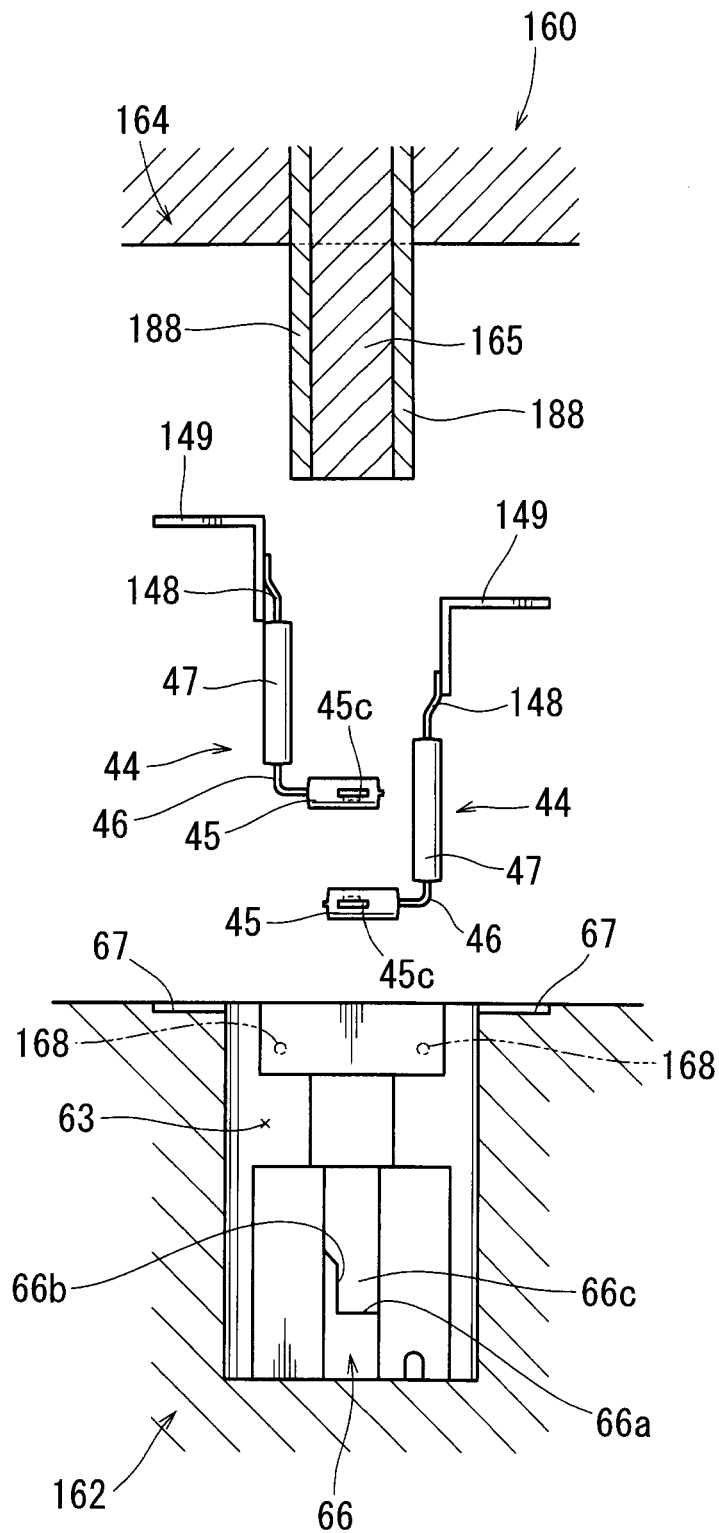
FIG. 16 is a cross sectional view showing the mold and the magnetic force detectors disassembled each other.
Figure 17:
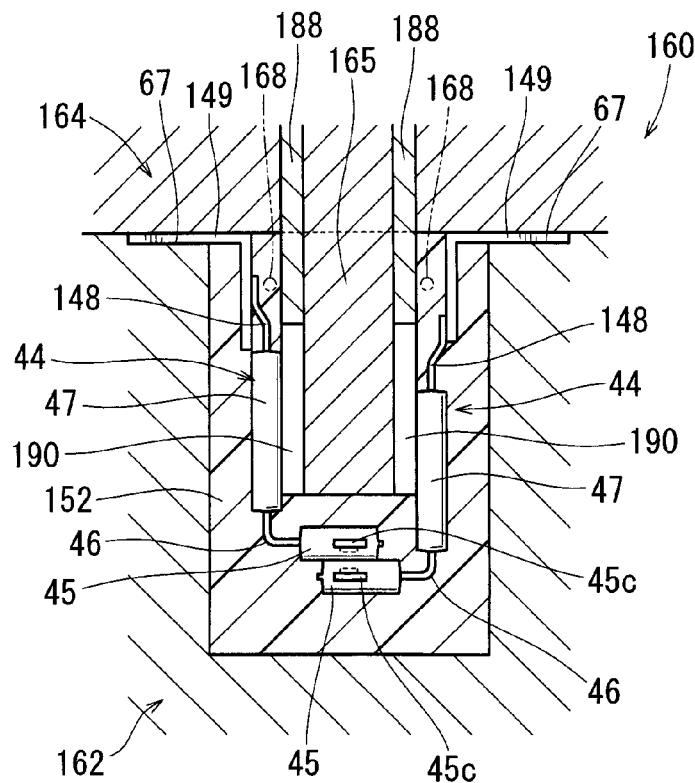
FIG. 17 is a cross sectional view showing the mold with retracted support molds in a manufacture process.

Next, a manufacturing method of the angle sensor device 140 and a mold used for the method will be described. FIG. 15 is a cross sectional view showing a mold used for manufacture of the angle sensor device. FIG. 16 is a cross sectional view showing the mold and the magnetic force detectors disassembled each other. FIG. 17 is a cross sectional view showing the mold with retracted support molds.

As shown in FIG. 16, a mold 160 is composed of a lower mold 162 and an upper mold 164. The upper mold 164 has a pair of plate-shaped support molds 188 contacting with either side surfaces of a projection 165, respectively. The support molds 188 extend an open-close direction of the mold 160, i.e., vertical direction in FIG. 16, and are constructed to move in the vertical direction. When the support molds 188 are located at a lower position, end surfaces (lower surfaces) of the support molds 188 are in a plane of an end surface (lower surface) of the projection 165 (FIG. 15). On the other hand, when the support molds 188 are located at an upper position, the end surfaces of the support molds 188 are located above the computing units 47 of the magnetic force detectors 44 in order to maintain a predetermined distance from the computing units 47 (FIG. 17). At the start of molding, the support molds 188 are moved to the lower position, and then are retracted to the upper position after completion of injection of the foamed resin and before hardening of the injected foamed resin.

A pair of gates 168 is provided at one sidewall defining the mold cavity 63 of the lower mold 162. The sidewall is perpendicular to the width direction of the magnetic force detectors 44. Each of the gates 168 is positioned near ends of the lead terminals 148 of the corresponding magnetic force detector 44, which is located closer than another (FIG. 15).

Next, a step for insert molding of foamed resin with the magnetic force detectors 44 in the mold 160 will be described.

Here, a step for putting the magnetic force detectors 44 in the lower mold 162 is same as that of the first embodiment, and thus will not be explained.

As shown in FIG. 15, after putting the magnetic force detectors 44 in the lower mold 162, the mold 160 is closed, i.e., the lower mold 162 and the upper mold 164 are engaged with each other. Thus, an open end of the mold cavity 63 of the lower mold 162 is closed with the upper mold 164 in order to form a sealed cavity 170. With this, the end portions of the mounting terminals 149 of the magnetic force detectors 44 are sandwiched and held between the lower mold 162 (in detail, bottom surfaces of the recesses 67) and the upper mold 164. In this way, the end portions of the mounting terminals 149 of the magnetic force detectors 44 are held by the mold 160 in order to prevent displacement of the magnetic force detectors 44 caused by flow of the foamed resin in melting condition during insert molding.

In a condition that the mold 160 is closed (FIG. 15), when the support molds 188 of the upper mold 164 are located at the lower position, an outside surface of one of the support molds 188 is contacted with an inside surface of the computing unit 47 of one of the magnetic force detectors 44, and the other support mold 188 contacts with the other magnetic force detector 44. Thus, the inside surfaces of the computing units 47 of the magnetic force detectors 44 are supported by the support molds 188, respectively.

Then, the foamed resin in the melting state is injected from the gates 168 of the lower mold 162 into the cavity 170 in order to produce the molded resin 152. In this step, the foamed resin is flowed substantially equally along both the inside surfaces and the outside surfaces of the computing units 47 of the magnetic force detectors 44 in order to equalize stress applied to the magnetic force detectors 44 by such flow.

As shown in FIG. 17, after injection of the foamed resin into the cavity 170, the support molds 188 are retracted to the upper position before the resin injected into the mold 160 become hardened. Empty spaces 190 are created due to retraction of the support molds 188, and the foamed resin flows into the empty spaces 190. Therefore, the inside surfaces of the computing units 47 of the magnetic force detectors 44, which had been supported by the support molds 180, are covered with the foamed resin (FIG. 14). In FIG. 14, portions constructed of the foamed resin and covering the inside surfaces of the computing units 47 of the magnetic force detectors 44 are labeled with symbol "152a". A cavity 153 is formed in the molded resin 152 due to the projection 165 of the upper mold 164 (FIG. 14). The molded resin 152 is cooled in order to become the foamed resin hardened, and then the mold 160 is opened and a product, i.e., the angle sensor device 140 is removed from the lower mold 162.

According to the production method of the angle sensor device 140, i.e., a forming method for the molded resin 152, insert molding of the foamed resin with the magnetic force detectors 44 is carried out in the condition that the inside surfaces of the computing units 47 of the magnetic force detectors 44 are supported by the support molds 188 of the mold 160 (FIG. 15). Therefore, it is able to prevent displacement of magnetic force detectors 44 caused by stress forced in the width direction of the computing units 47 of the magnetic force detectors 44 by flow of the foamed resin, thereby preventing decrease in positional accuracy of the magnetic force detectors 44. In a result, it is able to prevent decrease in magnetic force detection ability of the angle sensor device 40.

The support molds 188 supporting the computing units 47 of the magnetic force detectors 44 are retracted before the foamed resin injected into the cavity 170 in the mold 160 become hardened, so that the empty spaces 190 are formed (FIG. 17) and the foamed resin flows into the empty spaces 190. Thus, the inside surfaces of the computing units 47 of the magnetic force detectors 44, which had been supported by the support molds 188, are covered with the resin, which is labeled with 152a (FIG. 14).

In the step for injecting the foamed resin into the mold 160, the foamed resin in melting condition is injected along the longitudinal direction of the computing units 47 of the magnetic force detectors 44 from the gates 168 departing from the sensing units 45 of the magnetic force detectors 44 (FIG. 15). Therefore, it is able to reduce stress applied to the sensing units 45 of the magnetic force detectors 44 and caused by flow of the foamed resin. In addition, the foamed resin is flowed along the longitudinal direction of the computing units 47 of the magnetic force detectors 44, so that it is able to decrease stress applied to the computing units 47 of the magnetic force detectors 44 and caused by flow of the foamed resin in the through-thickness direction of the computing units 47.

The foamed resin composed of resin material and foaming agent is used as material for the molded resin 152. Thus, it is able to reduce flow pressure of the resin, thereby decreasing stress applied to the sensing units 45 and the computing units 47 of the magnetic force detectors 44.

A fourth embodiment will be described.

Figure 18:
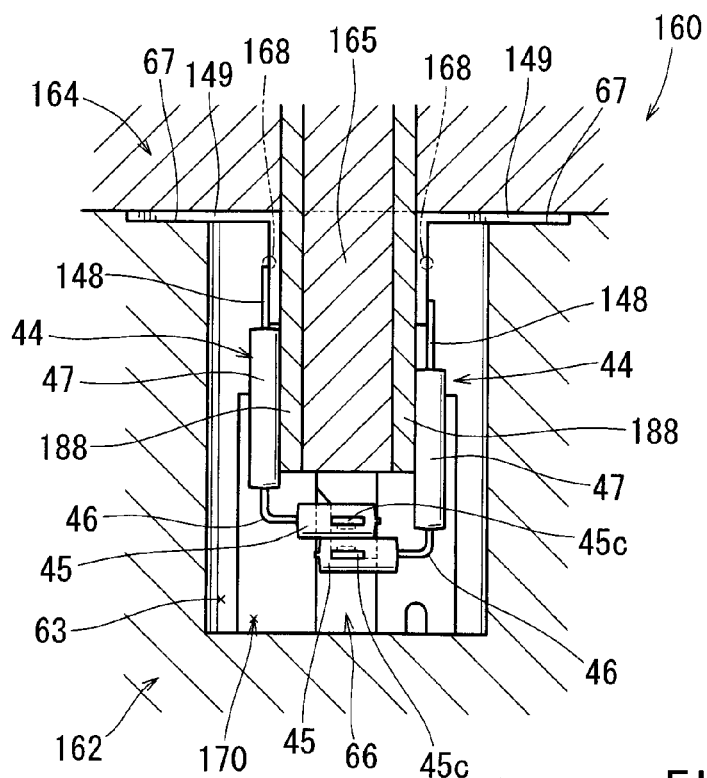
FIG. 18 is a cross sectional view of a mold and magnetic force detectors positioned in the mold of a fourth embodiment.
Figure 19:
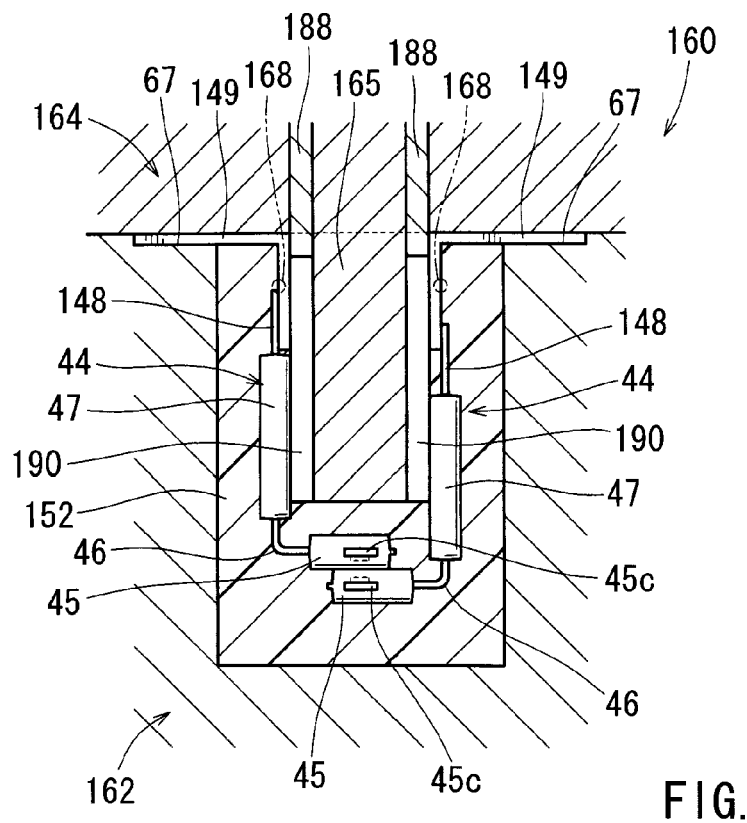
FIG. 19 is a cross sectional view showing the mold with retracted support molds in a manufacture process.

FIG. 18 is a cross sectional view of the mold, and FIG. 19 is a cross sectional view showing the mold with retracted support molds.

As shown in FIG. 18, in this embodiment, the lead terminals 148 of the magnetic force detectors 44 in the third embodiment (FIG. 16) are straightened. Inner surfaces of the ends of the lead terminals 148 are connected with the mounting terminals 149 by welding or the like. The base portion of each mounting terminals 149 has an inner surface flush with the inner surface of the computing unit 47 of the corresponding magnetic force detector 44, which is connected with the mounting terminal 149. The support molds 188 of the upper mold 164 in the lower position contact the inner surfaces of the computing units 47 of the magnetic force detectors 44 and the inner surfaces of the base portions of the mounting terminals 149 such that the support molds 188 support the inner surfaces of the computing units 47 of the magnetic force detectors 44 and those of the base portions of the mounting terminals 149.

In this embodiment, insert molding is carried out in a condition that the mounting terminals 149 connected with the lead terminals 148 of the magnetic force detectors 44 are supported by the support molds 188 of the mold 160 (FIG. 18). Thus, it is able to improve positional accuracy of the mounting terminals 149.

In addition, the retracted support molds 188 can support the inner surfaces of the base portions of the mounting terminals 149 except regions near the lead terminals 148 (FIG. 19). When the support molds 188 of the upper mold 164 are retracted, ends of the base portions of the mounting terminals 149 near the lead terminals 148 are exposed on surfaces defining the empty spaces 190. Thus, when the foamed resin flows into the empty spaces 190, connections between the lead terminals 148 of the magnetic force detectors 44 and the base portions of the mounting terminals 149 are covered with the foamed resin.

A fifth embodiment will be described.

Figure 20:
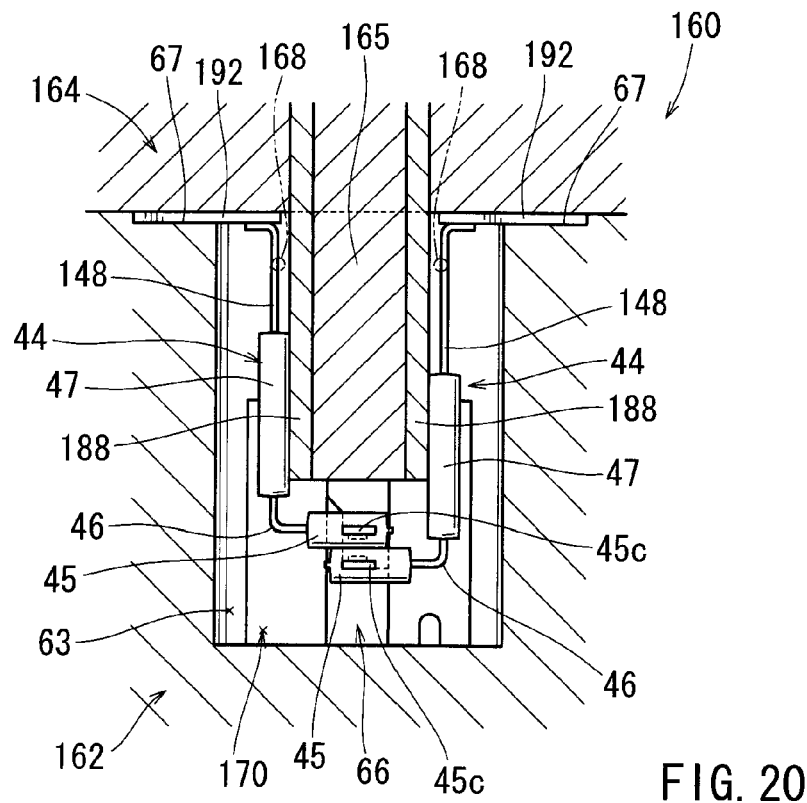
FIG. 20 is a cross sectional view of a mold and magnetic force detectors positioned in the mold of a fifth embodiment.
Figure 21:
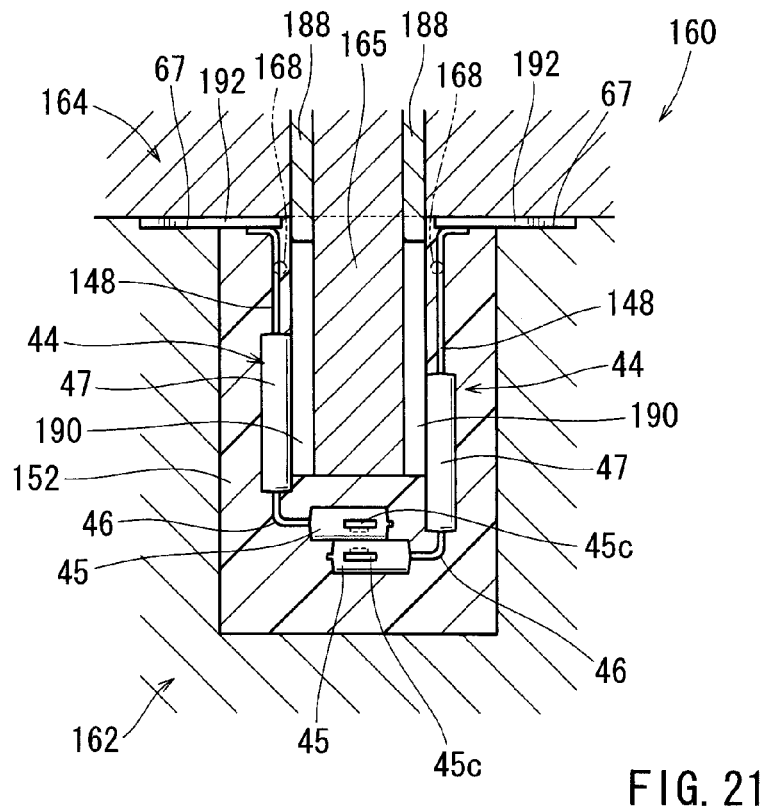
FIG. 21 is a cross sectional view showing the mold with retracted support molds in a manufacture process.

FIG. 20 is a cross sectional view of the mold. FIG. 21 is a cross sectional view showing the mold with the retracted support molds.

As shown in FIGS. 20 and 21, in this embodiment, the base portions of the L-shaped mounting terminals 149 in the third embodiment (FIG. 16) are omitted, and the mounting terminals are formed in strip shape, which are labeled with symbol "192". Thus, the lead terminals 148 of the magnetic force detectors 44 are formed in linear shape, and ends of the lead terminals 148 are bent outwardly in L-shape. A back surface (upper surface in FIG. 20) of the end of each lead terminal 148 is connected with a front surface (lower surface in FIG. 20) of each mounting terminal 192 by welding or the like.

Figure 22:
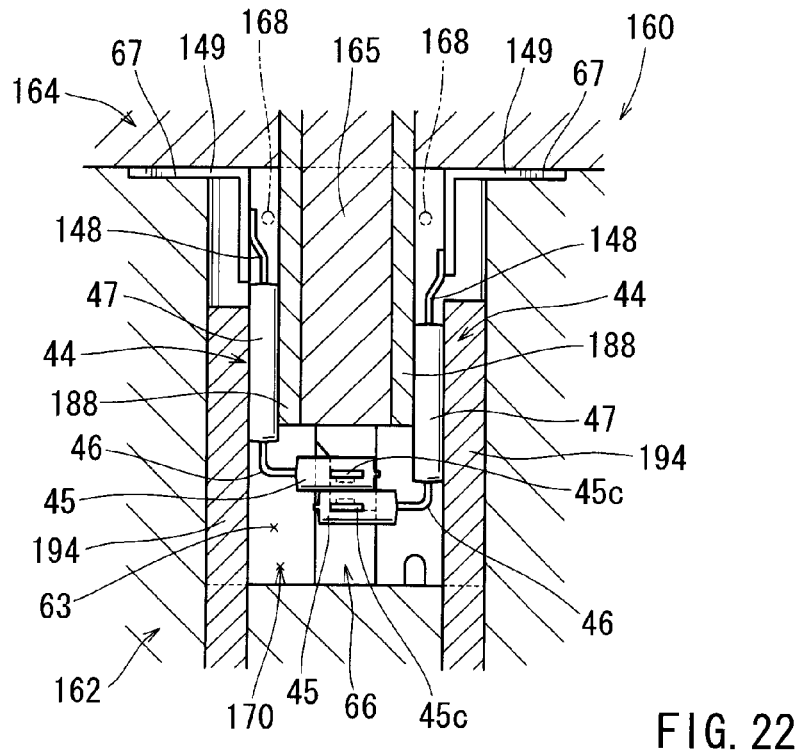
FIG. 22 is a cross sectional view of a mold and magnetic force detectors positioned in the mold of a sixth embodiment.
Figure 23:
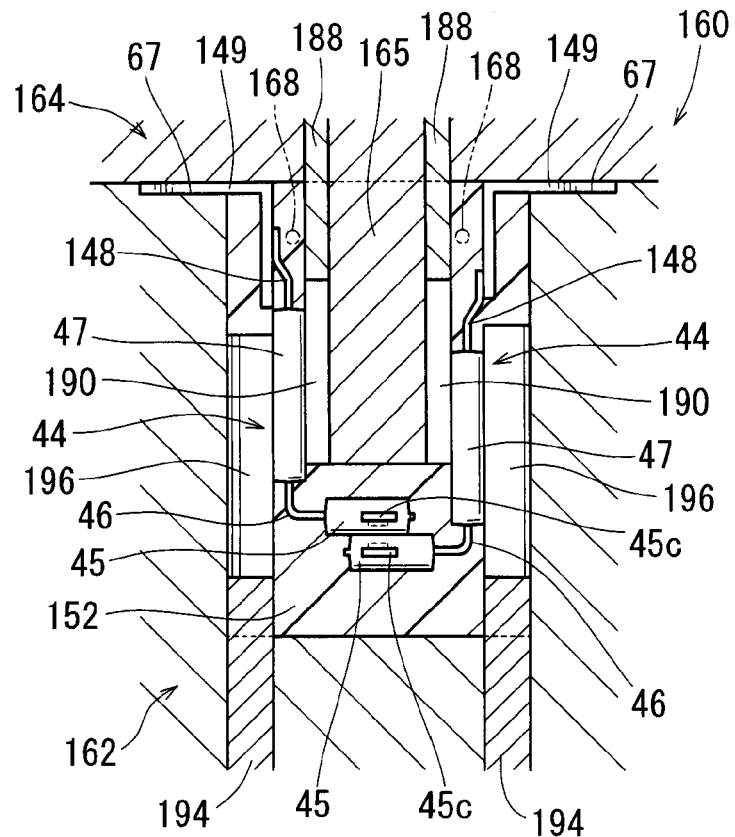
FIG. 23 is a cross sectional view showing the mold with retracted support molds in a manufacture process.
Figure 24:
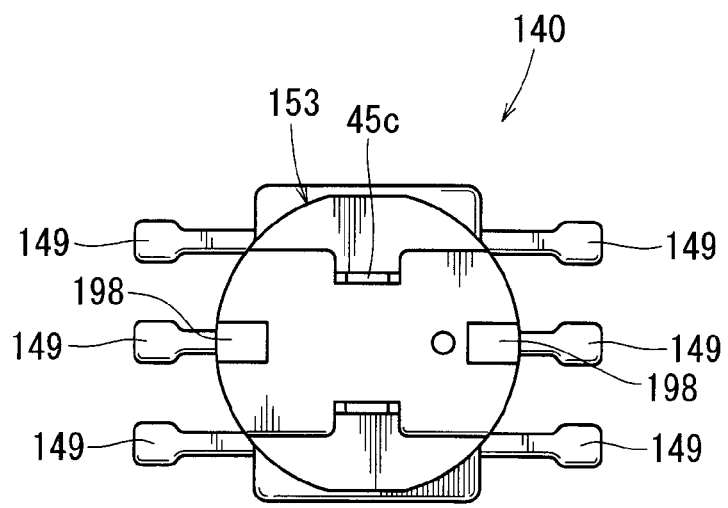
FIG. 24 is a front view of an angle sensor device.
Figure 25:
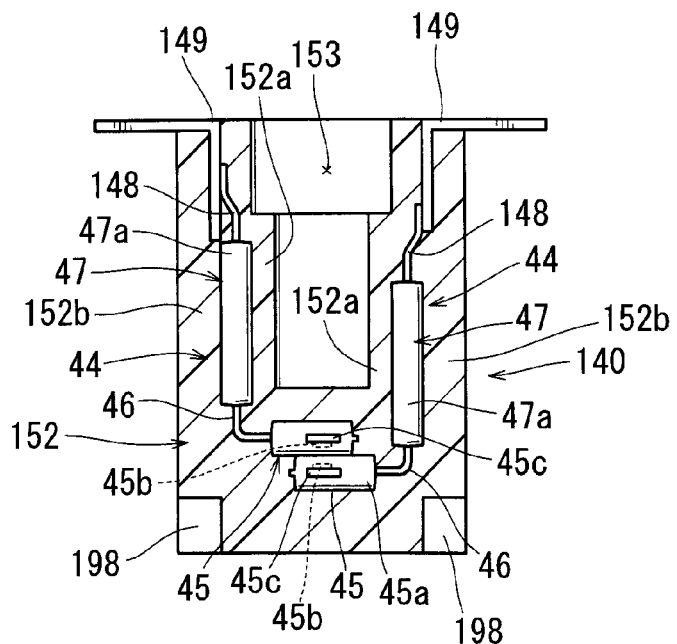
FIG. 25 is a cross sectional view of the rotational angle detection device.

A sixth embodiment will be described. This embodiment corresponds to the third embodiment further including additional modifications, so that the modifications will be described, and other configurations will not be described. FIG. 22 is a cross sectional view of the mold. FIG. 23 is a cross sectional view showing the mold with the retracted support molds. FIG. 24 is a front view of the angle sensor device. FIG. 25 is a cross sectional view of the angle sensor device.

As shown in FIG. 22, the mold 160 of this embodiment has the lower mold 162 of the mold 160 of the third embodiment (FIG. 17) further including a pair of second support molds 194 in square bar shape, which contact either side surfaces defining the mold cavity 63, respectively. Hereafter, the support mold 188 is referred to as first support mold.

The second support molds 194 extend in an open-close direction of the mold 160, i.e., vertical direction, and are constructed movably in the vertical direction. When the second support molds 194 are in upper position, end surfaces (upper end surfaces) of the second support molds 194 are positioned near the back ends of the computing units 47 of the magnetic force detectors 44 (FIG. 22). When the second support molds 194 are in lower position, the end surfaces of the second support molds 194 are positioned near the front sensing unit 45 (FIG. 23). The second support molds 194 are moved to the upper position at the start of molding, and then are retracted to the lower position after injection of the resin and before hardening of the resin.

In a condition that the mold 160 is closed (FIG. 22), the second support molds 194 of the lower mold 162 are positioned at the upper position, and inner surfaces of the second support molds 194 contact outer surfaces of the computing units 47 of the magnetic force detectors 44. Thus, one side surface in the through-thickness direction of the computing unit 47 of each magnetic force detector 44 (in the horizontal direction in FIG. 22), i.e., the outside surface, is supported by each of the second support molds 194.

As shown in FIG. 23, the second support molds 194 are retracted to the lower position after injection of the foamed resin into the cavity 170 and before hardening of the resin injected into the mold 160. Empty spaces 196 are created due to retraction of the second support molds 194, and the foamed resin flows into the empty spaces 196. Therefore, the outside surfaces of the computing units 47 of the magnetic force detectors 44, which had been supported by the second support molds 194, are covered with the foamed resin (FIG. 25). In FIG. 25, parts of the foamed resin covering the outside surfaces of the computing units 47 of the magnetic force detectors 44 are labeled with symbol "152$b$". In addition, after retraction of the second support molds 194, grooves 198 are formed on either side of the front end of the molded resin 152 by the ends (upper ends) of the second support molds 194 (FIGS. 24 and 25).

According to the manufacture method of the angle sensor device 140, i.e., the method for forming the molded resin 152, the insert molding is carried out in the condition that both surfaces (the inside surfaces and the outside surfaces) in the through-thickness direction of the computing units 47 of the magnetic force detectors 44 are supported by the first support molds 188 and the second support molds 194 (FIG. 22). Thus, during insert molding of foamed resin with the magnetic force detectors 44, it is able to prevent displacement of magnetic force detectors 44 caused by stress, which is induced by flow of the foamed resin in the through-thickness direction of the computing units 47 of the magnetic force detectors 44.

The second support molds 194 supporting the computing units 47 of the magnetic force detectors 44 are retracted before hardening of the foamed resin injected into the cavity 170 in the mold 160 in order to create the empty spaces 196 (FIG. 23). Then, the foamed resin flows into the empty spaces 196. Thus, the outside surfaces of the computing units 47 of the magnetic force detectors 44, which had been supported by the second support molds 194, can be covered with the resin 152$b$ (FIG. 25).

A seventh embodiment will be described.

Figure 26:
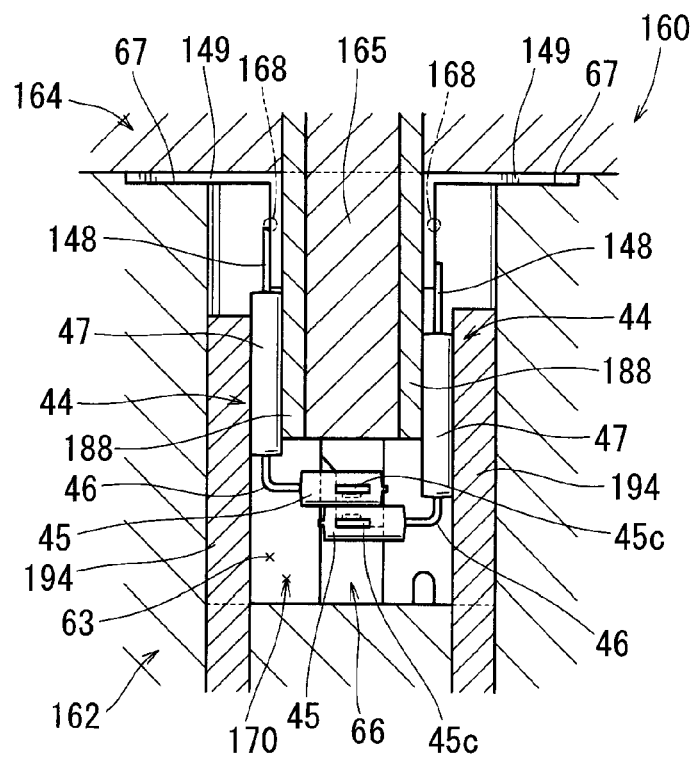
FIG. 26 is a cross sectional view of a mold and magnetic force detectors positioned in the mold of a seventh embodiment.
Figure 27:
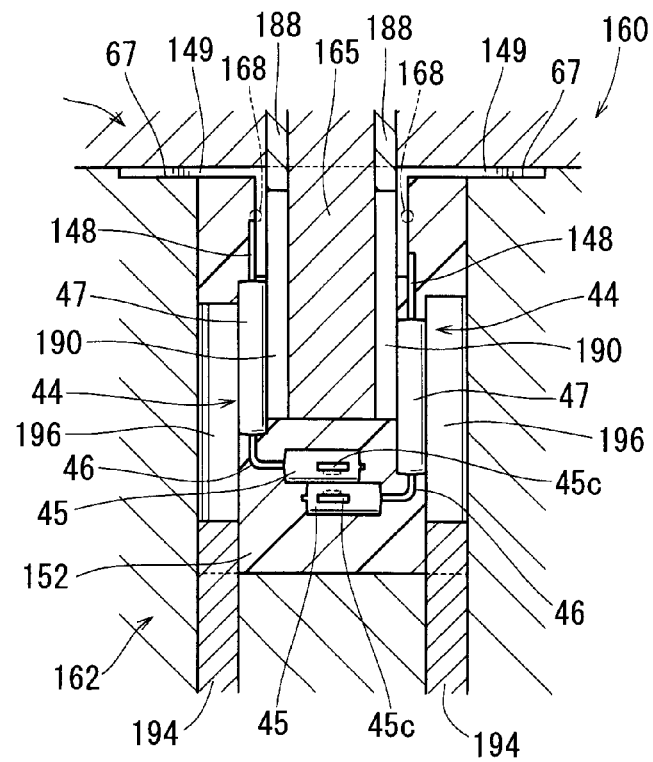
FIG. 27 is a cross sectional view showing the mold with retracted support molds in a manufacture process.

FIG. 26 is a cross sectional view of the mold. FIG. 27 is a cross sectional view showing the mold with the retracted support molds.

As shown in FIGS. 26 and 27, in this embodiment, the lead terminals 148 of the magnetic force detectors 44 in the sixth embodiment (FIGS. 22 and 23) are changed in liner shape and ends of the lead terminals 148 are connected with the mounting terminals 149 by, for example, welding like the forth embodiment (FIGS. 18 and 19). Other configurations are same as those of the fourth embodiment and thus will not be explained.

An eighth embodiment will be described.

Figure 28:
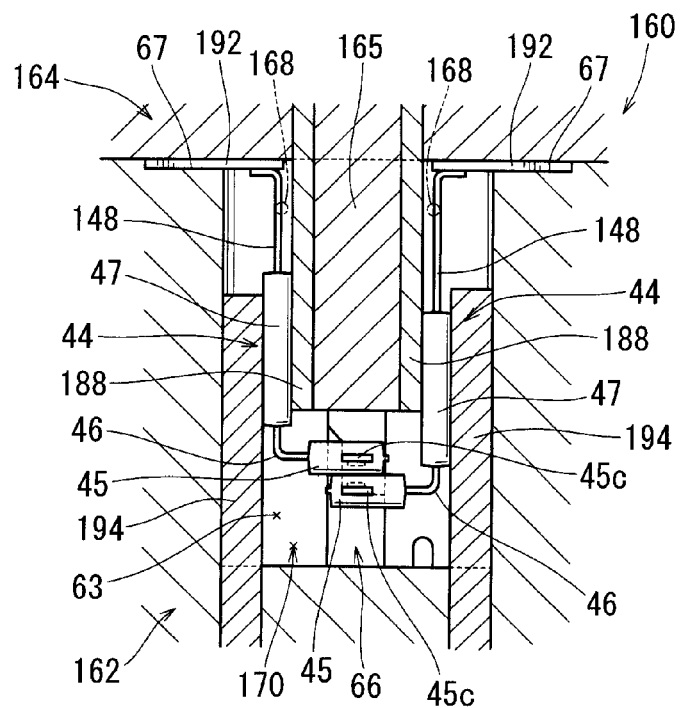
FIG. 28 is a cross sectional view of a mold and magnetic force detectors positioned in the mold of a eighth embodiment.
Figure 29:
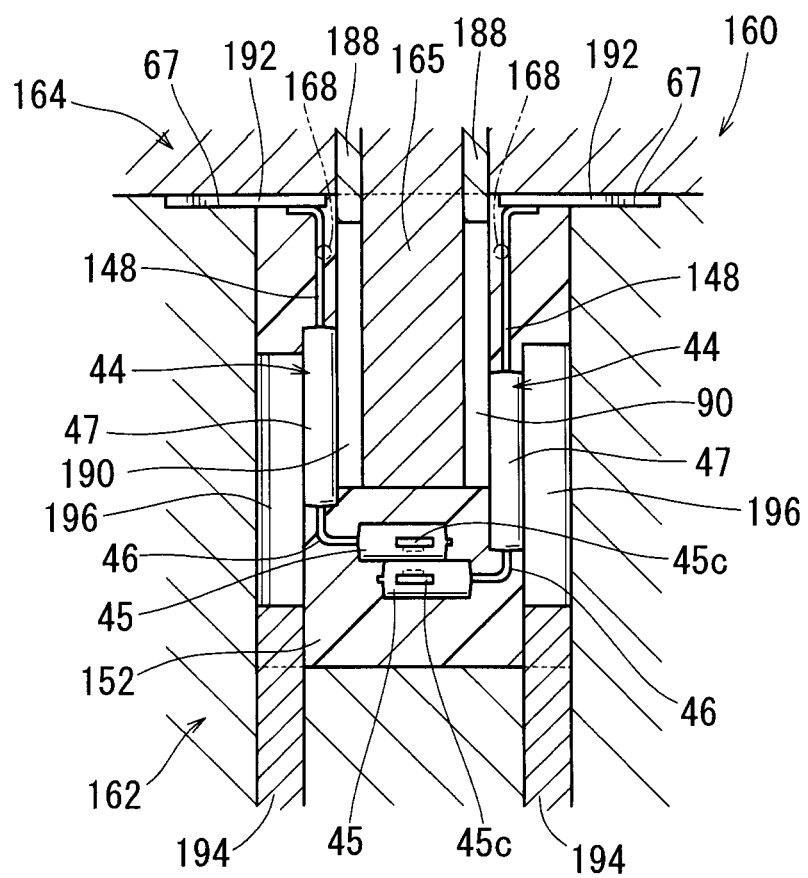
FIG. 29 is a cross sectional view showing the mold with retracted support molds in a manufacture process.

FIG. 28 is a cross sectional view of the mold. FIG. 29 is a cross sectional view showing the mold with the retracted support molds.

As shown in FIGS. 28 and 29, in this embodiment, the lead terminals 148 of the magnetic force detectors 44 in the sixth embodiment (FIGS. 22 and 23) are changed in linear shape and ends of the lead terminals 148 are bent outwardly in L-shape and are connected with the mounting terminals 192 in strip shape by, e.g., welding like fifth embodiment (FIGS. 20 and 21). Other configurations are same as those of the fifth embodiment and thus will not be explained.

This disclosure is not limited to the above-described embodiments and can be modified without departing from the scope of the invention. For example, the angle sensor devices 40, 140 for detecting opening ratio of the throttle valve 18 of the throttle controller 10 are shown in the embodiments, however this disclosure can be applied to other angle sensor devices for detecting rotation angle of various rotatable members other than the throttle controller 10. The electrically controlled throttle controller 10 is shown in the embodiment, however this disclosure can be applied to a mechanical throttle controller where the throttle valve 18 is mechanically opened and closed based on an angle of accelerator pedal via link, cable, etc. Though the sensor IC is used for the magnetic force detector 44, hall element, hall IC or the like can be used for the magnetic force detector. Though each of the magnetic force detectors 44 of the embodiments detects rotation angle of the throttle gear 22 depending on direction of magnetic field between the pair of permanent magnets 41, a device detecting rotation angle of the throttle gear 22 depending on strength of the magnetic field between the pair of permanent magnets 41 can be used. Though the magnetic force detectors 44 each having the sensing unit 45 and the computing unit 47 are used in the embodiment, a magnetic force detector having a module in which the sensing unit 45 and the computing unit 47 are integrated or a magnetic force detector having only the sensing unit 45 can be used. The pair of the magnetic force detectors 44 is used in the embodiments, however only one magnetic force detector 44 can be used. The resin for the molded resin 52, 152 is not limited to foamed resin. The projection 65, 165 of the upper mold 64, 164 of the mold 60, 160 can be provided with the first support molds 188 of the sixth embodiment (FIG. 22) fixedly, or can be integrated with support members substantially corresponding to the first support molds 188.

This invention claims:

1. An angle sensor device for detecting rotation angle of a rotatable member, comprising:
    a molded body constructed of resin;
    a pair of magnetic force detectors buried in the body and detecting alteration of magnetic force caused by rotation of the rotatable member and outputting signals depending on the rotation angle of the rotatable member; and
    a pair of mounting terminals each having a base portion;
    wherein each of the magnetic force detectors comprises: a sensing unit detecting the alteration of magnetic force and outputting first signals depending on the alteration of magnetic force; and a computing unit coupled with the sensing unit in L-shape and computing based on the first signals from the sensing unit and then outputting second signals depending on the rotation angle of the rotatable member,
    wherein the computing units are entirely buried in the body,
    wherein the magnetic force detectors are opposite each other, such that the sensing unit of one of the magnetic force detectors is positioned on the sensing unit of the other magnetic force detector,
    wherein the molded body defines a cavity surrounded by the magnetic force detectors; and
    wherein the base portions are exposed at an inner wall defining the cavity.

2. The angle sensor device according to claim 1, wherein each of the magnetic force detectors comprises lead terminals having connections with the mounting terminals, and the connections are buried in the molded body.

3. The angle sensor device according to claim 1 wherein each of the magnetic force detectors comprises lead terminals each having an end projecting from the molded body.

4. The angle sensor device according to claim 1, wherein the molded body is covered with another resin; and the foamed resin is composed of foaming agent and materials for the another resin.

5. A throttle controller comprising:
    a throttle body defining an intake pathway therein and having the angle sensor device according to claim 1;
    a throttle valve having the rotatable member and being disposed rotatably in the intake pathway; and
    a motor rotating the throttle valve in order to control an amount of air flowing through the intake pathway.

* * * * *